Nov. 10, 1964 G. H. HUFFERD 3,156,227

PIEZOELECTRIC VOLTAGE GENERATOR

Filed Oct. 22, 1962 2 Sheets-Sheet 1

INVENTOR.
GEORGE H. HUFFERD

BY Edward E. Focke

ATTORNEY

Nov. 10, 1964 G. H. HUFFERD 3,156,227

PIEZOELECTRIC VOLTAGE GENERATOR

Filed Oct. 22, 1962 2 Sheets-Sheet 2

INVENTOR.
GEORGE H. HUFFERD

BY

[signature]

ATTORNEY

United States Patent Office 3,156,227
Patented Nov. 10, 1964

3,156,227
PIEZOELECTRIC VOLTAGE GENERATOR
George H. Hufferd, Lyndhurst, Ohio, assignor to Clevite Corporation, a corporation of Ohio
Filed Oct. 22, 1962, Ser. No. 231,891
15 Claims. (Cl. 123—148)

This invention relates to an improved piezoelectric voltage generator which is adapted to be employed in conjunction with an internal combustion engine ignition system.

The improvement of the piezoelectric voltage generator resides in a new mode of loading the piezoelectric elements which effectively eliminates many of the difficulties experienced with prior art devices.

In order that the novelty of this invention can be appreciated the terms as used herein will be briefly explained.

Heretofore, two basic loading principles have been used to actuate the piezoelectrically responsive elements. One is generally referred to as hammering or impact loading and the other as a squeezing action whose resultant characteristics are the same as a static load.

Impact loading takes place when a load, which is already moving, is brought to bear upon another body. The impact occurs when the two bodies, at least one of which must be moving prior to contact, collide. Impact loading produces a stress greater than that produced by an equal static load.

A squeezing action produces a stress when one body is brought to bear against another body at a rate which increases gradually from zero to full intensity. The loading member is initially at rest in contact with the member to be loaded. It does not store potential energy for immediate release; consequently loading cannot be effected from a point of maximum value of potential energy. The stress, so produced, is the same as that produced by a static load.

An impact loading device is shown in J. R. Harkness, U.S. Patent Nos. 2,871,280, 2,649,488, 2,717,589 and in British Patent No. 712,803 issued to McCulloughs Motor Corporation. The device utilizing the static loading approach is illustrated in G. H. Hufferd et al. U.S. Patent No. 3,009,975.

A third mode of loading, the subject of this invention, is termed sudden loading. This mode of loading differs from the others in that the load is touching but not significantly bearing against the other body prior to being brought into action. This load is at its maximum potential prior to its sudden release. Since the velocity vectors of the load, and loaded body, are equal and in the same direction, following release, contact is maintained during the displacement of the system. This sudden loading method, similar to the squeeze or static loading method, allows the load to be applied against the body starting from zero velocity. However, because the loading member is released at its maximum value of potential energy it is capable of producing a stress which is twice that produced by an equal static load. This of course allows the use of a smaller load to produce a given stress level within the piezoelectric element.

Unfortunately, the devices of the prior art have certain shortcomings. As is pointed out in Hufferd Patent No. 3,009,975, the impact method is not only inherently noisy, but is unable to take advantage of reversible ferroelectric domain switching which can substantially increase the generated voltage produced by the fundamental piezoelectric effect. Because of the relatively slow action in the squeeze or static loading mode, time is available to allow the domains to reverse between each action and substantially augment the fundamental piezoelectric effect. The present invention, although acting suddenly, allows a relatively long time interval between each action during which the ferroelectric domains can reverse and act additively with the fundamental piezoelectric effect.

Another disadvantage of the impact loading method is the result of simultaneous pressure waves induced within the piezoelectric element causing the element to rapidly generate alternating polarities of electrical potential when contracting and expanding, respectively, any gap which is in series with the element, such as a spark plug, is subjected to these high frequency polarity changes.

It has been frequently demonstrated in the internal combustion engine field that significantly larger potenials are required to break down a sparking gap with alternating polarities than with a potential of one polarity. This requires additional output and can adversely affect the ignition timing characteristics.

Another vital and distinguishing factor is the nature of the stresses produced by impact loading. The known chemical compositions for piezoelectric elements can be partially or wholly depoled when subjected to overstress conditions. Since high local stresses are produced by impact loading, significant deterioration of the piezoelectric characteristics of the element can be experienced. Static loading has some inherent advantages over impact loading, particularly, in that it produces a single contraction which causes an electric potential of one polarity to be generated, and a single expansion producing another potential but of opposite polarity, both potentials being independently useful. Static loading avoids vibration in the piezoelectric element which has been noted to have considerable effect on the efficiency of voltage output. Certain applications, however, such as automobile ignition systems and some others, require a very exact and accurate timing of the potential which is to be generated by the application of the load. Thus the application of a static load to a piezoelectric element and the resultant voltage generated is too slow for accurate timing and necessitates a switching device between the element and the spark plug.

To alleviate this problem, unique switching devices have been arranged in systems of the prior art. These devices do more or less solve this problem, however, the advantage is considerably depreciated by the cost of this equipment.

It has now been recognized that some of the beneficial features of both impact and static loading may be realized when the piezoelectric elements are suddenly loaded. Sudden loading, as heretofore described, produces a greater stress than static loading; for loads which produce a final, equal deflection, the stress caused by the suddenly applied load is twice that caused by static loading. However, since there is substantially less shock energy expended compared to impact loading, the amount of vibration is considerably less. Sudden loading does not negate the beneficial effect of reversible ferroelectric domain switching noted above. Because of its nature, sudden loading is capable of generating a voltage in timed relation to a given engine component so as to eliminate the necessity of an additional switching or timing device. Furthermore, since the load is already in contact with the body, the amount of time necessary to bring the load to bear upon this body has been lessened.

It is therefore the primary object of this invention to provide an improved piezoelectric voltage generator which avoids the shortcomings of the devices of the prior art as discussed in the preceding paragraphs.

It is a further object of this invention to provide a piezoelectric generator adapted to be employed in internal combustion engine ignition systems and which avoids the need of a switch yet retains all the preferred electrical characteristics.

It is a further object of this invention to provide a piezoelectric voltage generator adapted to be employed in an internal combustion engine ignition system that includes a simple and unique device for advancing or retarding the spark in fixed relation with the reciprocation of the engine crankshaft.

For a better understanding of the present invention, together with other and further objects thereof, reference is had to the following description taken in connection with the accompanying drawing, and its scope will be pointed out in the appended claims.

An aspect of the present invention resides in the provision of an improved piezoelectric voltage generator which is adapted to be employed in conjunction with an internal combustion engine ignition system and includes a housing which has an abutment rigid against displacement. A piezoelectric element is disposed within the housing and is piezoelectrically responsive in compression; one end of the element is disposed in fixed relation to the abutment. A force applying member is operably arranged in bearing relation with the piezoelectric element and is effective to apply force to the other end of the element in response to actuation thereof. And an actuating member bears against the force applying member to apply a sudden force upon the force applying member for transfer of the force to the element to generate an electric potential.

Figure 1:
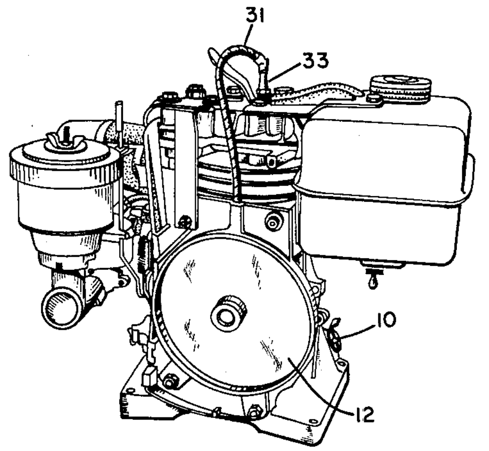
FIGURE 1 shows a typical internal combustion engine with the flywheel removed.
Figure 2:
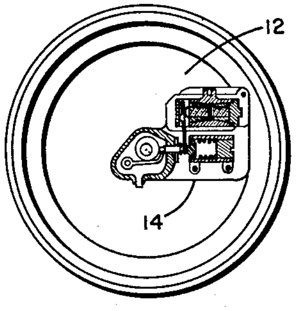
FIGURE 2 is an enlarged view of a part of the engine illustrated in FIGURE 1 showing the crankcase wall for mounting the piezoelectric ignition system of this invention.

Referring now to the drawing, in which similar members are identified by the same numeral, there is shown in FIGURE 1 a typical combustion engine 10, and FIGURE 2 illustrates in greater detail a crankcase wall 12 which mounts a piezoelectric voltage generator 14 which is suitably fastened thereto.

Figures 3, 4:
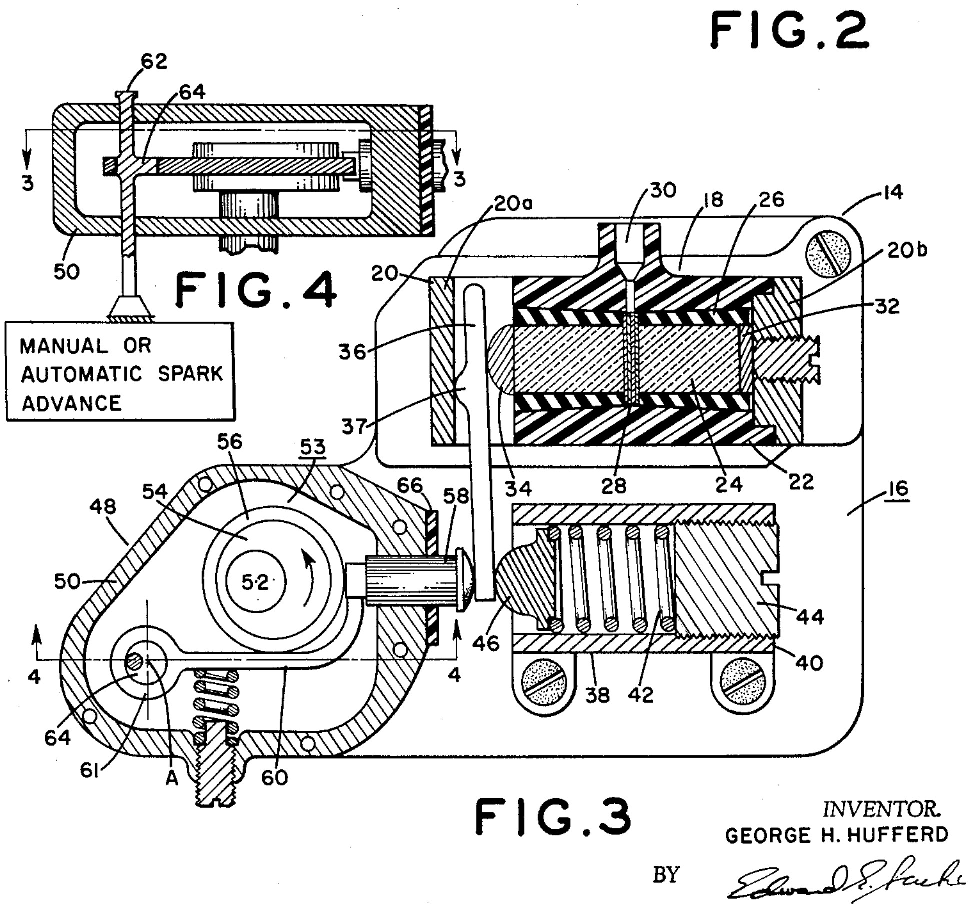
FIGURE 3 is a plane view of the piezoelectric voltage generator shown in section taken along line 3—3 of FIGURE 4.
FIGURE 4 is an elevational view in section taken along line 4—4 in FIGURE 3 of part of the piezoelectric voltage generator illustrated in FIGURE 3.

The piezoelectric voltage generator 14, see FIGURES 3 and 4, includes a base 16 fabricated from metal or other suitable material. Secured to the base 16 is a flat metal plate 18 formed with two spaced apart apertures which receive a U-shaped frame 20 having ends 20*a* and 20*b* extending perpendicular with respect to the plate 18. The frame 20 is constructed of a metallic material to maintain rigidity and position during the actuation of the device. Between the ends of the U-shaped frame 20 is disposed an insulating plastic container 22 adapted to house two piezoelectrically responsive elements 24 arranged end to end, each element 24 is surrounded by a rubber insulating sleeve 26 which is tapered to tightly seat the element within the container 22.

A plurality of thin aluminum discs 28 are positioned between the two elements 24. These discs 28 are in contact with an electrical conductor 31, see FIGURE 1, which extends through the opening 30 provided in the container 22. The outer ends of the elements abut metal end discs 32 and 34. The disc 34 is half circular and the peak thereof is aligned with the central axis of the elements.

Between the disc 34 and frame portion 20*a* there is suitably positioned a longitudinally extending force applying lever 36. The lever is provided with an integral ridge 37 to provide a fulcrum point about which the lever can be pivoted, the ridge being suitably located with respect to the ends of the lever to establish a predetermined force ratio. The ridge or fulcrum point 37 is always in engagement with the end member 20*a* of the frame 20.

The discs 32 and 34, the lever 36 and the ends 20*a* and 20*b* of the frame provide, in combination, suitable electric grounding for the elements. The ceramic elements 24 thus disposed, are mechanically in series and electrically parallel. The elements are composed of polycrystalline ceramic material such as barium titanate, lead zirconate or the like and are suitably polarized and electroded. It will be obvious to those conversant with the art that a single element or more than two elements may be used instead of the two elements disclosed in the drawing.

Cooperating with the lever 36 is an actuating mechanism 38 adapted to store potential energy and for suddenly releasing the potential energy upon the lever for transfer and application upon the elements, and a loading device 48 for loading mechanism 38 with the potential energy and for controlling the release thereof.

More particularly, the actuating mechanism 38 includes a tubular housing 40 securely connected to base plate 16 and internally constructed to receive a compression spring 42 which is disposed between a threaded plug 44 inserted in the housing 40 and a movably and coaxially disposed guide member 46. The spring is effective to bias the guide member against the lever 36 and to maintain this contact with the lever at all times. The spring is precompressed for reasons which will hereafter become more apparent.

The energy loading device 48 includes a housing 50 mounted on the base plate 16 and a cam shaft 52 extending through or being rotatably mounted on the housing 50. A bushing 54 eccentrically surrounds the cam shaft 52 and is press-fitted thereon and rotatably mounts a sleeve 56 made of bearing material. The cam shaft 52, the bushing 54 and the sleeve 56 constitute, in combination, a cam member 53 adapted to load the spring 42 of the actuating mechanism 38 with potential energy, hereafter further explained. Interposed between the cam member 53 and the lever 36 is a force transmitting circular piston 58, slidably mounted in housing 50. The piston diameter is enlarged at one end to serve as an abutment against the housing, and the opposite end of the piston is slightly turned down to permit locking engagement with a restraining latch 60.

The latch 60 consists of a relatively thin bar terminating at one end with an eyelet 61 and the other end portion is suitably curved to engage the piston 58 and cam sleeve 56 at a particular time during operating sequence.

Figure 11:
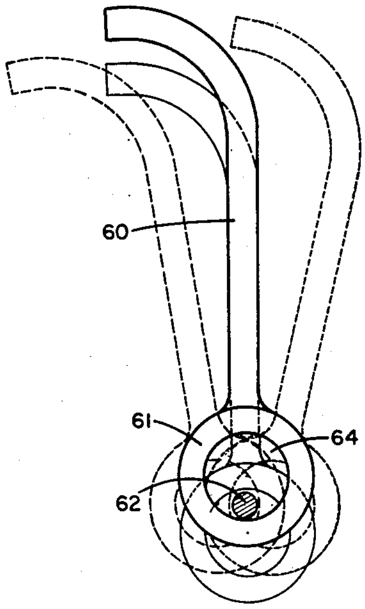
FIGURE 11 illustrates, diagrammatically, the orbit of the latch for advancing or retarding spark timing.

The restraining latch 60 is spring biased against the cam sleeve 56 and is journaled on a circular bushing 64 to enable oscillating motion about an axis designated A. The bushing 64 is formed integral with shaft 62, see FIGURE 4, but eccentrically arranged with respect thereto, the shaft 62 being rotatable in the housing 50 and effective to vary the location of the axis A relative to the position shown in FIGURE 3. FIGURE 11 illustrates the variability of the location of axis A of bushing 64.

While the operation of piezoelectric generator is described in conjunction with an ignition system for internal combustion engines it is quite obvious that this device has utility independent of ignition systems.

In the environment referred to in the preceding paragraph, the cam shaft 52 is either connected to or integrally formed with a crank or camshaft (not shown) of an internal combustion engine. Therefore, the cam 53 rotates in timed relation with the reciprocating piston (not visible) of the engine 10 which conventionally turns the crankshaft.

Figure 7:
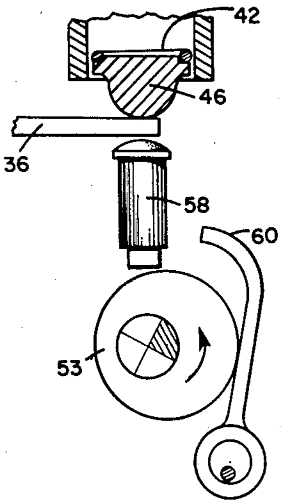
Figure 8:
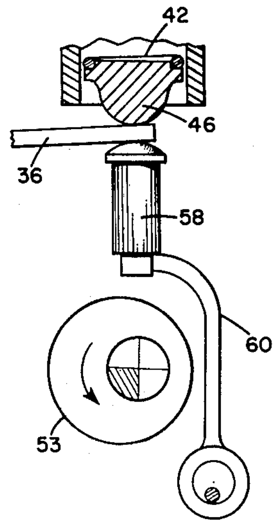

Referring now to FIGURES 5 through 8, it will be seen that rotation of the cam 53 causes the piston 58, see FIGURE 7, to be forced against the lever 36 moving the lever in opposition to the spring 42 to compress the spring to a predetermined degree. Compressing the spring, is of course, tantamount to loading the spring 42 with potential energy.

Figure 5:
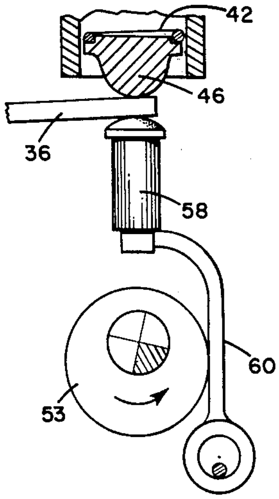
FIGURES 5 through 8 illustrate, diagrammatically, the operating sequence of part of the mechanism for actuating the piezoelectric elements.
Figure 6:
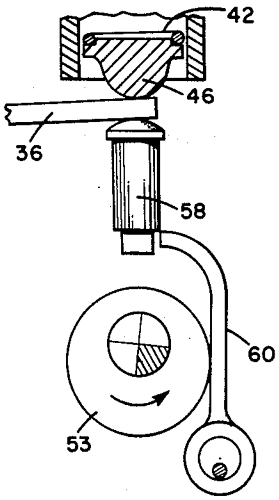

This counterclockwise movement of the lever is not in any appreciable way effective to compress the elements 24, on the contrary, serves to relax them. In any event, after the cam has suitably loaded the spring 42, the latch 60 which has followed the movement of the cam engages the piston 58, to restrain movement of the force applying lever 36 and, ultimately, to preclude the release of the potential energy of the now loaded spring upon the lever other than in timed relation with the rotation of the cam member 53. The relative location of the latch 60 and the cam 53 is such, that when the reciprocating piston of the engine has substantially reached firing position, the cam 53 engages the latch 60 as shown in FIGURE 5, suddenly disengaging the latch from the piston, see FIGURE 6, causing the potential energy stored in the spring to be suddenly applied upon the lever from zero velocity, and from its maximum predetermined value. It is here essential that the "load" bears already against the force applying lever and that no additional potential energy is added to the loaded spring subsequent to the release of the restraining latch.

The force applying lever 36 transfers this sudden force, in like manner, and applies same to the piezoelectric elements 24 whereby a potential of one polarity is generated which is conducted through disc 28 and conductor 31 to the spark plug 33.

At this moment in the operating sequence, the piston 58 "floats" freely between the lever 36 and the cam 53. This condition occurs due to the balancing counterforce of the elements which resist the sudden, lever applied, force. The lever will come to rest only after the force exerted by the spring is balanced by the resisting force of the elements so that the piston 58 is, in no event, slammed against the housing as is ordinarily done in the prior art and which produces such an objectionable noise. A minimal plastic pad 66 is shown on the housing 50 to reduce wear between the piston and the housing 50. It should also be noted, that the lever comes to rest only after having moved what is for all practical purposes an indeterminate distance. This distance since it changes automatically and constantly varies due to ambient influences on the elements and due to structural characteristics of the element and the spring which change slightly with use due to wear and tear.

If the structure of the elements 24 becomes relaxed due to such factors, the voltage drop will not be so pronounced as where the lever travel has a fixed value since, as stated above, the travel is variable and is governed by the balance of forces.

During the rotation of the cam shaft immediately following the above described sequence, the cam again loads the spring 42, moving the lever 36 to an unloaded position of the elements 24 where another potential, of a polarity opposite from the one immediately preceding, is generated and transmitted to the spark plug or otherwise disposed of.

Figure 9:
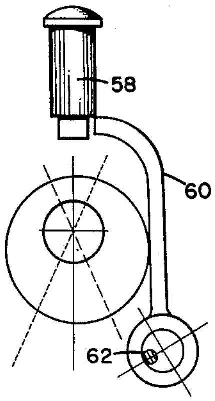
FIGURES 9 and 10 illustrate, diagrammatically, some of the operating sequence of the mechanism for advancing or retarding the spark timing.
Figure 10:
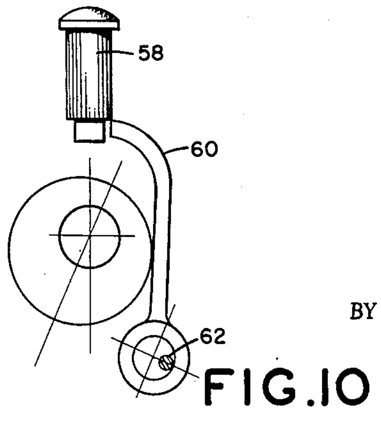

It is well known in the art that spark timing adjustments are necessary to maintain a smooth and efficient internal combustion engine. The spark that is produced in timed relation with the position of the reciprocating piston (not shown) of engine 10, is preferably advanced or retarded depending upon the speed of the engine. There are numerous devices such as vacuum and centrifugal mechanism to accomplish this desired effect. This invention facilitates a tie-in with such a conventional mechanism, see FIGURE 4. By rotating shaft 62 as is illustrated in FIGURES 9 and 10, such result is readily obtained.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. A piezoelectric voltage generator comprising, in combination:
   - housing means having an abutment rigid against displacement;
   - piezoelectric element means within said housing means and piezoelectrically responsive in compression, one end of said element means being disposed in fixed relation to said abutment;
   - force applying means operably arranged in bearing relation with said element means and effective to apply force to the other end of said element means in response to actuation thereof;
   - actuating means bearing against said force applying means and adapted to store potential energy and for releasing the potential energy to apply a sudden force at zero velocity upon said force applying means for transfer of said force to said element means to generate an electric potential.

2. A piezoelectric voltage generator comprising, in combination:
   - housing means having an abutment rigid against displacement;
   - piezoelectric element means within said housing means and piezoelectrically responsive in compression, one end of said element means being disposed in fixed relation to said abutment;
   - force applying means operably arranged in bearing relation with said element means and effective to apply force to the other end of said element means in response to actuation thereof;
   - actuating means constructed and arranged for storing potential energy and for bearing against said force applying means;
   - and means for releasing said potential energy at its maximum predetermined value to apply a sudden force at zero velocity upon said force applying means for transfer of said force to said element means to generate an electric potential.

3. A piezoelectric voltage generator according to claim 2, and energy loading means for storing a predetermined amount of said potential energy in said actuating means.

4. A piezoelectric voltage generator according to claim 3, wherein said actuating means includes spring means, and the energy loading means includes a rotatably disposed cam member adapted to compress said spring means.

5. A piezoelectric voltage generator according to claim 4, wherein said force applying means includes a lever having a fulcrum located in respect to its ends to establish a predetermined force ratio, and said spring means bearing on one end of said lever and the other end of said lever bearing against said element means.

6. A piezoelectric voltage generator according to claim 5, wherein said piezoelectric element means, said force applying means and said actuating means are constructed and arranged with respect to each other so that said applying means upon actuation thereof comes to rest only after the force exerted upon it by said actuating means is balanced by the resisting force of the element means.

7. A piezoelectric element according to claim 6, wherein said force applying means rests only after moving an automatically controlled distance.

8. A piezoelectric voltage generator according to claim 5, and restraining means in operative engagement with said force applying means to restrain the movement thereof for precluding the release of the potential energy of said spring means upon said lever other than in timed relation with the rotation of said cam member.

9. A piezoelectric voltage generator according to claim 8, wherein said cam is constructed and arranged for sequentially disengaging said restraining means with respect to said force actuating means.

10. An ignition system for an internal combustion engine of the type wherein a reciprocating piston turns a crankshaft and includes a spark plug, comprising:
piezoelectric element means;
mechanical force applying and actuating means having a predetermined value of stored potential energy and being disposed for operating in timed relation with the rotation of said crank shaft and connected with said piezoelectric element means to periodically apply a sudden force to the element means, the force being applied from zero velocity and at its maximum value through an automatically controlled distance, to generate an electric potential;
and an electric circuit to connect the piezoelectric element means to said spark plug to discharge said potential through the spark plug.

11. An ignition system according to claim 10, and energy loading means for loading, periodically, in timed relation with the rotation of said crank shaft, said mechanical force applying means to said predetermined value, of stored energy.

12. An ignition system according to claim 11, and restraining means for periodically releasing said potential energy, in timed relation with the rotation of said crank shaft.

13. An ignition system according to claim 12, and spark advance and retarding means connected with said restraining means for varying the timed release of said electric potential.

14. A piezoelectric voltage generator comprising, in combination:
housing means having an abutment rigid against displacement;
piezoelectric element means within said housing means and piezoelectrically responsive in compression, one end of said element means being disposed in fixed relation to said abutment;
a force applying lever operably arranged in bearing relation with the other end of said element means and effective to apply a sudden force to said element means in response to actuation thereof;
actuating means including a spring for storing potential energy and bearing against said lever;
a cam rotatably disposed effective to store potential energy in said spring;
and a movable restraining latch in operating engagement with said lever to preclude movement thereof and to sequentially release said potential energy.

15. A piezoelectric voltage generator according to claim 14, and a circular bearing for rotatably supporting said latch, and a rotatable shaft, eccentrically arranged with respect to said bearing for varying the position of said bearing.

References Cited in the file of this patent

UNITED STATES PATENTS

| | | |
|---|---|---|
| 2,649,488 | Harkness | Aug. 18, 1953 |
| 2,959,159 | McCrory et al. | Nov. 8, 1960 |

FOREIGN PATENTS

| | | |
|---|---|---|
| 712,803 | Great Britain | July 28, 1954 |

UNITED STATES PATENT OFFICE
CERTIFICATE OF CORRECTION

Patent No. 3,156,227 November 10, 1964

George H. Hufferd

It is hereby certified that error appears in the above numbered patent requiring correction and that the said Letters Patent should read as corrected below.

Column 5, lines 42 and 43, for "indeterminate distance. This distance since it changes automatically and constantly varies due to ambient in-" read -- indeterminate distance since it changes automatically and constantly. This distance varies due to ambient in- --.

Signed and sealed this 27th day of April 1965.

(SEAL)
Attest:

ERNEST W. SWIDER
Attesting Officer

EDWARD J. BRENNER
Commissioner of Patents